United States Patent
Okada

(10) Patent No.: US 6,800,309 B2
(45) Date of Patent: *Oct. 5, 2004

(54) BROTH/STOCK AND METHODS FOR PREPARATION THEREOF

(75) Inventor: Kineo Okada, Tokyo (JP)

(73) Assignee: Ariake Japan Co., Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 10/190,884

(22) Filed: Jul. 3, 2002

(65) Prior Publication Data

US 2004/0043114 A1 Mar. 4, 2004

(51) Int. Cl.[7] .............................................. A23L 1/313
(52) U.S. Cl. ........................ 426/78; 426/129; 426/589; 426/655; 426/657; 426/437; 426/466; 426/506; 426/513
(58) Field of Search .......................... 426/78, 129, 589, 426/655, 657, 437, 466, 506, 513

(56) References Cited

U.S. PATENT DOCUMENTS

| | | | |
|---|---|---|---|
| 3,099,562 A | | 7/1963 | Rogers |
| 3,394,017 A | * | 7/1968 | Christopher ................ 426/533 |
| 3,666,491 A | * | 5/1972 | Trouba ....................... 426/293 |
| 4,009,286 A | | 2/1977 | Moll et al. |
| 4,016,295 A | | 4/1977 | Burrows et al. |
| 4,218,487 A | * | 8/1980 | Jaeggi ........................ 426/533 |
| 4,362,750 A | | 12/1982 | Swartz |
| 4,411,991 A | | 10/1983 | Hirakawa et al. |
| 4,432,997 A | | 2/1984 | Reimerdes |
| 4,587,127 A | | 5/1986 | Akao et al. |
| 4,759,933 A | | 7/1988 | Uchida et al. |
| 4,820,529 A | | 4/1989 | Uchida et al. |
| 4,963,370 A | | 10/1990 | Uchida et al. |
| 5,431,940 A | | 7/1995 | Calderas et al. |
| 5,486,367 A | | 1/1996 | Fung |
| 5,695,802 A | * | 12/1997 | Van Den Ouweland et al. ......................... 426/533 |
| 6,063,410 A | | 5/2000 | Vedamuthu et al. |
| 6,077,546 A | | 6/2000 | Iritani et al. |
| 6,103,282 A | | 8/2000 | Nakashima |
| 6,110,510 A | | 8/2000 | Blortz et al. |
| 6,126,979 A | * | 10/2000 | Herreid et al. .............. 426/285 |

OTHER PUBLICATIONS

De Marchis, et al "Review:Carnosine–Related Dipeptides in Neurons and Glia" http://www.protein.biomsu.ru/biokhimiya/contents/v65/full/65070969.htm.

Kaur, et al "Concentration of Anserine and Carnosine in Surimi Wash Water" http://www.co fex.com/ift/98 annual/accepted/364.htm.

Zhou, et al "Ability of Carnosine Related Dipeptides and Amino Acids to Quench Aldehydic Lipid Oxidation Products" http://www.confex.com/ift/98 annual/accepted/1040.htm.

Huang, et al "Concentrations and Antioxidative of Anserine and Carnosine in Poultry Meat Extracts Treated with Demineralization and Papain" Proc. Natl SciCounc.Roc(B), vol. 24, No. 4, 2000 pp 193–201.

* cited by examiner

Primary Examiner—N. Bhat
(74) Attorney, Agent, or Firm—Milde & Hoffberg LLP

(57) ABSTRACT

A method of producing a broth or stock, comprising mincing animal bone, mixing meat and/or meat extract and/or bone extract with the minced bone; and heating the mixture to effect coagulation thereof. The heating step may comprise retort sterilization. The coagulated mixture may be provided in a water permeable container, to retain insoluble material. A hydrometer may be provided with the minced bone, to assist in determining soup concentration. The invention provides an extended release of soup into boiling water of a period of hours, allowing replenishment of withdrawn soup stock.

17 Claims, 1 Drawing Sheet

BROTH/STOCK AND METHODS FOR PREPARATION THEREOF

FIELD OF THE INVENTION

The present invention relates to the field of broths or stocks, and more particularly to a broth or stock comprising minced bone pieces with extract, and the production methods involved therein. The bones are preferably from chicken.

BACKGROUND OF THE INVENTION

In hotels, restaurants, Chinese restaurants, and Chinese noodle shops, in order to use bones as ingredients for soup stock, one has had to use fresh ingredients, and those ingredients have had to be frozen for both storage and distribution. In order to make soup from bones, the production process has required complicated work involving heat adjustment, scum removal, filtration, clarifying the liquid, and boiling it down to the proper concentration. Depending on the experience of those preparing the soup, their differing levels of technical skill have had a significant impact on product quality, making it difficult to maintain product uniformity. Furthermore, though there are products on the market containing finely chopped, frozen bones filled in a porous bag, the problem with these products is that as a result of being frozen as loosely-separated, fine pieces, they end up being extracted in an extremely short period of time. As a result, the extractable portion ends up being extracted in 1-2 hours when making the soup, and it has not been possible to make soup in a stock pot with a consistent quality that could be maintained throughout the business hours of the restaurants, hotels, etc. Furthermore, because of the size of the bones, only a set amount can be put into the large pot, and it has been difficult to make thick soups characteristic of certain types of cuisines, for example Chinese noodle shops. Artificial seasonings have sometimes been added to enhance the flavor, however, this reduces the versatility of the product by limiting seasoning options, and these practices have impaired consumer acceptance.

Up until the present, there have not been any natural food bases that can be stored and distributed at room temperature, which can deliver a soup whose concentration can be adjusted as desired, and is capable of maintaining a consistent quality over a relatively long period of time, such as the daily business hours of restaurants, hotels, etc.

SUMMARY OF THE INVENTION

One object of the present invention is to provide flexibility for storage and distribution conditions of a soup base, by offering a product that can be stored and distributed at room temperature. In addition, the present invention offers a natural food base that is preferably solidified into block form through the coagulation of the ingredients, based on the minced bone pieces and the retort sterilization of the raw ingredients, and which can be readily used in its block form to make soup with a consistent quality and adjustable concentration and extraction time.

The principal ingredient employed in the present invention is preferably chicken bones, but is not limited to broiler chickens, leftover bones from chickens used for their meat, and breeding hens, but can also be in the form of whole chickens, including their meat, or chicken meat itself. Meat and/or bones from pork, etc. may also be used. The extract from meat and/or bone can be in liquid, powdered, or other form.

Extract can be made, for example from the meat and/or bones, which are extracted with hot water and concentrated to a desired strength. The extraction may be performed on an industrial scale. The extract may for example, be condensed and made into a highly concentrated extract. Alternatively, it may be made into powdered extract through, for example, spray-drying methods. Commercially available concentrated meat extract products may be employed.

Next, the chicken bones are minced. Preferably, a chopper is used to mince the chicken bones into 3 mm diameter pieces. Extract is added to the minced bones and the ingredients mixed together thoroughly. When the bones are minced into smaller pieces, the pieces stick together closely and the soup stock is extracted at a slower speed of extraction. On the other hand, when the bones are minced into larger pieces, the bone pieces stick together loosely, and the soup stock is extracted at a faster speed of extraction. Also, the concentration can be adjusted with the addition of the extract, thereby enabling the concentration of the soup to be adjusted to fit various types of cuisine.

The mixed product is minced bone and meat and/or bone extract 1, filled into retort pouches 3 whose openings are then sealed. These sealed pouches 3 are put into a retort sterilization machine to kill bacteria and microorganisms. During this time, the mixed product will coagulate under the heat, and solidify. Tests conducted on broiler chicken bones, leftover chicken bones from chicken used for meat, and breeding hen bones, all yield substantially similar results.

The minced bones and extract may be placed in a water-permeable, sealed container 2, which is placed inside the sealed pouch 3 for retort processing. This water permeable, sealed container 2 provides mechanical protection for the coagulated mass, and retains insoluble components during extraction of the soup or stock.

According to the present invention, the coagulated mass provides an extended release of soluble matter into the soup or stock, while initially releasing a significant portion to speed initial preparation. As compared to traditional soup-making, therefore, the present invention provides a faster initial availability of soup, while allowing a stock pot to be refilled with water over the course of several hours, as volume is depleted while generally maintaining the quality of the soup for the duration. Traditionally, with known minced bone preparations, adding water to replace withdrawn volume would result in dilution of the soup, whereas according to the present invention, the dissolved solids are replaced during the course of a shift.

In order to monitor the dissolution of solids, and therefore the density of the soup, a hydrometer 4 may be used. This measures the specific gravity of the liquid, to quantify dissolved solids. According to the present invention, a disposable hydrometer 4 may be included in the retort pouch 3, which would thus be provided in a sterile condition along with the soup base. Such a hydrometer is formed, for example, by a sealed air chamber with a weight at one end and a measuring scale at the other. Increased dissolved solids in the soup will cause greater density, and therefore the hydrometer will be more buoyant. The height of the scale above the fluid level therefore may be calibrated in terms of the specific gravity of the soup. This hydrometer 4 may then be used to determine an appropriate volume of replacement water or readiness of the soup or stock, and to prevent over-dilution when the soup base is exhausted.

Of course, any type of known hydrometer may be employed, or the replacement volume determined empirically, based on a predetermined formula, or using other known means.

While a preferred method for providing delayed or controlled release of meat and/or bone extract is to provide a coagulated mass of bone fragments and meat and/or bone extract, other known delayed or controlled release techniques may be used, for example encapsulation, gel matrix, erosion matrices, and other techniques. Where other controlled release technologies are employed, a different method of sterilization may be used, for example ozone or hydrogen peroxide, radiation, or other known non-thermal sterilization. However, thermal coagulation of the minced bones and extract is a preferred method of production.

A preferred embodiment of the invention provides a natural food base in the form of a soup stock from poultry and other animal meat and/or bones, made from a solidified mixture of minced meat and/or bones as the main ingredient with added meat and/or bone extract. The soup stock's taste, aroma, and extraction time may be adjusted through the alteration of the ratio of added extract. The product's retort sterilization enables it to be distributed and stored at room temperature. The food base provided in this form does not require frozen distribution and storage.

As small bone pieces will stick closely together and slow down the extraction time while larger pieces will stick together more loosely, resulting in a faster extraction time, by altering the size of the minced bone pieces according to the present invention, the extraction time can be adjusted to fit the business hours of restaurants, hotels, etc., for example to provide a duration of extraction of 5–8 hours. Due to the denaturing of the protein in meat and/or bone during the retort process, scum does not develop, and a clear soup stock is produced with good flavor quality and appearance. Furthermore, the concentration of the soup stays constant over a long period of hours, despite volume replenishment in the pot.

Due to the coagulation and moderate hardening of the meat and/or bone, even if it is cooked for a long time in a pot, it can not easily break apart while boiling. In addition, because it has a small volume for its weight compared to chicken bones, only a small amount of solid need be put in the pot, thus dramatically reducing the amount of work involved. Furthermore, when cooking for a long time, unlike with products of finely chopped chicken bones on the market, the concentration of the extracted soup stays the same over a long period of hours, despite volume replenishment.

The soup stocks from the meat and bones of poultry and other animals according to a preferred embodiment of the present invention is storage stable at room temperature, thereby providing flexibility for storage and distribution conditions. In addition, the present invention provides a natural food base that can produce high-quality soup over many hours with an adjustable concentration.

DETAILED DESCRIPTION OF THE INVENTION

Figure 1:
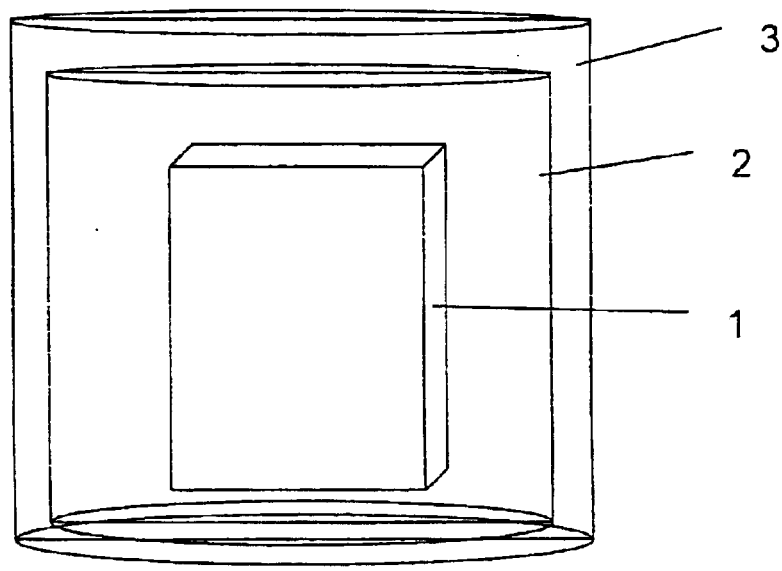
FIG. 1 shows a retort sterilized pouch with a permeable bag surrounding a solidified product.
Figure 2:
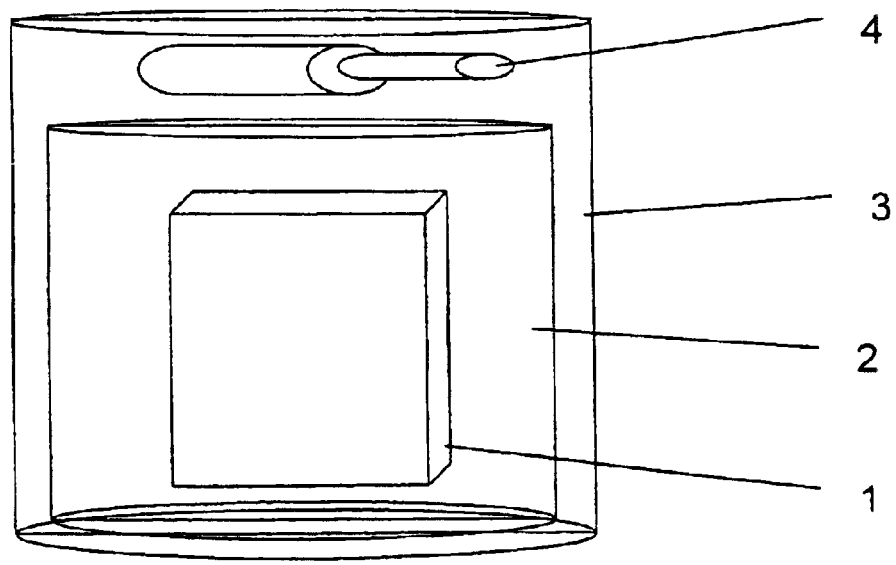
FIG. 2 shows the pouch of FIG. 1 further including a hydrometer

This invention is explained in detail using the following practical examples. However, the intended uses for this invention are not limited to the examples given.

EXAMPLE 1

20 kg of broiler chicken bones were minced into 3 mm diameter pieces in a chopper. Next, the 20 kg of minced bones were combined with 1.2 kg of chicken extract and blended until the mixture was uniform. The above mixture was divided into 1 kg portions, which were each filled into a retort pouch that was then sealed with an impulse sealer. The retort conditions were adjusted in order to yield an F value of 20. This is the same as would be done for raw meat, to kill about 3 times the amount of bacteria as would be done for extract only. After the sterilization, when the pouch was opened, it contained a 788 g lump of meat and 212 g of juice (Brix 8.2).

A trial was conducted by putting 1 kg of the above invention product into a pot and cooking it along with 20 liters of water and 0.2 kg of vegetables (onions, green onions, carrots, ginger, and garlic). The results of the extraction time and concentration of the extracted soup stock are shown in Table 1.

TABLE I

| Correlation between extraction time and portion of solid 1 hr. | | | | | |
|---|---|---|---|---|---|
| Item | 1 hr | 2 hr | 3 hr | 4 hr | 5 hr |
| Invention | 0.4 | 0.4 | 0.6 | 0.8 | 1.0 |
| Bone packet on the market (Chicken bones) | 0 | 0.6 | 0.6 | 0.6 | 0.6 |
| Bone packet on the market (Pork bones) | 0 | 0.6 | 0.6 | 0.6 | 0.6 |

1 kg of each product was extracted in 10 liters of boiling water
Values in Brix %.

The test results suggest that even if the product is cooked for a long period of hours, the product quality does not change, and the soup can maintain a consistent quality over a long period of hours.

EXAMPLE 2

20 kg of bones from breeding hens were minced into 3 mm diameter pieces in a chopper. Next, the 20 kg of minced bones were combined with 1.2 kg of chicken extract and mixed until the mixture was uniform. The above mixture was divided into 1 kg portions, which were each filled into a retort pouch that was then sealed with a impulse sealer. The retort conditions were adjusted in order to yield an F value of 20. This is the same as would be done for raw meat, in order to kill about 3 times the amount of bacteria as would be done for extract only. After the sterilization, when the pouch was opened, it contained a 741 g lump of meat and 259 g of juice (Brix 14.4).

The present invention provides flexibility for storage and distribution conditions by offering a product that can be stored and distributed at room temperature. In addition, this invention has produced a natural food base that can be easily used by anyone to make a soup stock with a consistent quality and an adjustable concentration.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A broth or stock comprising minced hydrated bone pieces, solidified by heating with a mixture of one or more of added meat, meat extract and bone extract.

2. The broth or stock according to claim 1, contained within a water permeable container, permitting aqueous extraction of the broth or stock while retaining insoluble matter.

3. The broth or stock according to claim 1, wherein chicken bones form a principal ingredient.

4. The broth or stock according to claim 1, wherein the broth or stock's taste, aroma, concentration, and extraction time are adjusted by altering one or more of a size of the minced bone pieces and/or the ratio of added extract.

5. The broth or stock according to claim 1, further comprising a mixture of one or more of vegetables, spices, and other seasonings.

6. The broth or stock according to claim 1, wherein said broth or stock is storage stable at room temperature.

7. The broth or stock according to claim 1, wherein said broth or stock is retort sterilized.

8. A method of producing a broth or stock, said broth or stock resulting from a hot water extraction of a composition produced by the steps comprising:

(a) mincing animal bone;

(b) mixing one or more of meat, meat extract and bone extract with the minced bone; and (c) heating the mixture to effect coagulation.

9. The method according to claim 8, wherein the animal bone is principally chicken bone.

10. The method according to claim 8, wherein the animal bone comprises pork bone.

11. The method according to claim 8, further comprising the step of adjusting the broth or stock's taste, aroma, concentration, and extraction time through the alteration of at least one of the size of the meat and/or minced bone pieces and a ratio of added extract.

12. The method according to claim 8, further comprising the step of mixing the minced bone with a mixture or one or more of vegetables, vegetable extract, spices, and other seasonings.

13. The method according to claim 8, wherein said heating comprises retort sterilization.

14. A room temperature storage stable, sterile, water permeable pouch containing bone chips, adapted for extraction in hot water to produce a broth or stock.

15. A kit, adapted for producing a broth or stock in hot water, comprising a water permeable pouch containing bone chips, and a hydrometer.

16. The kit according to claim 15, wherein said hydrometer is within said pouch.

17. A broth or stock base, comprising minced bone, and a mixture of one or more of meat extract and bone extract, in a delayed release matrix.

* * * * *